(12) United States Patent
Momose

(10) Patent No.: US 8,390,851 B2
(45) Date of Patent: Mar. 5, 2013

(54) NETWORK SYSTEM AND PRINTER DRIVER

(75) Inventor: Naotoshi Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 890 days.

(21) Appl. No.: 12/456,102

(22) Filed: Jun. 10, 2009

(65) Prior Publication Data

US 2009/0303529 A1   Dec. 10, 2009

(30) Foreign Application Priority Data

Jun. 10, 2008 (JP) ................. 2008-151400
Jun. 24, 2008 (JP) ................. 2008-164127
Jun. 24, 2008 (JP) ................. 2008-164128

(51) Int. Cl.
  *G06F 15/00* (2006.01)
  *G06K 1/00* (2006.01)
(52) U.S. Cl. .......... 358/1.15; 358/1.9; 358/1.13
(58) Field of Classification Search .......... None
  See application file for complete search history.

(56) References Cited

U.S. PATENT DOCUMENTS 7,075,670 B1 * 7/2006 Koga ............... 358/1.15

FOREIGN PATENT DOCUMENTS

| JP | 2000-353081 | 12/2000 |
|---|---|---|
| JP | 2002-297343 | 10/2002 |
| JP | 2006-309725 | 11/2006 |
| JP | 2007-233662 | 9/2007 |

OTHER PUBLICATIONS

"Point and Print," technology in the Windows (registered trademark) operating system of Microsoft corporation disclosed, for example, in "Overview of Point and Print technology," [online], Jun. 18, 2003 [Searched on May 13, 2004].

* cited by examiner

*Primary Examiner* — Thierry Pham
(74) *Attorney, Agent, or Firm* — Nutter McClennen & Fish LLP; John J. Penny, Jr.; Christina M. Sperry

(57) ABSTRACT

A network system includes a print server to which a printer is connected, a file server, and one or more client terminals, wherein the print server, the file server, and the one or more client terminals are connected together on a network. The client terminal includes a printer driver that controls the printer, a first setting file in which setting information of the printer driver arranged in a first folder, in which the printer driver is arranged, is stored, and a second setting file in which the setting information arranged in a second folder other than the first folder is stored. When the setting information is newly created or changed, a third file in which the setting information is written is arranged in the file server. In addition, address information of the third file that is arranged in the file server is stored in a memory area of the print server.

6 Claims, 6 Drawing Sheets

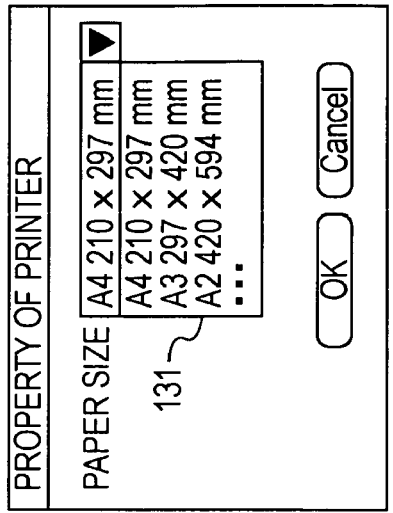
FIG. 3B
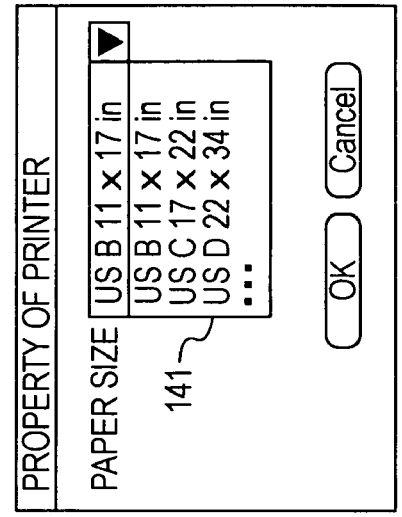
FIG. 3E
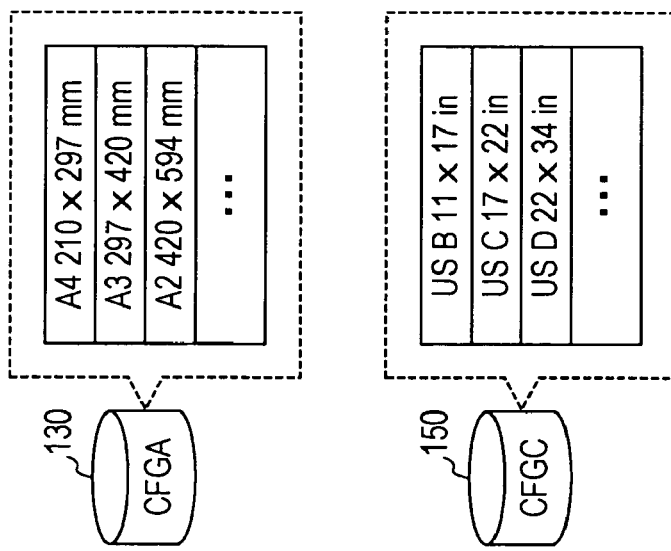
FIG. 3A
FIG. 3C
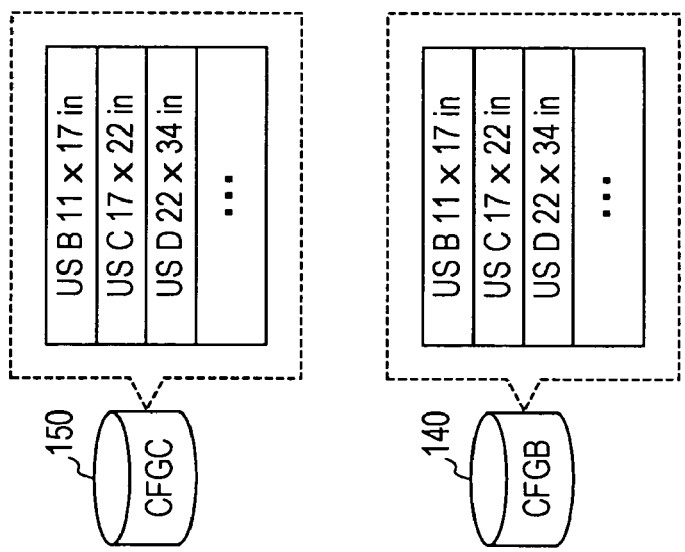
FIG. 3D

NETWORK SYSTEM AND PRINTER DRIVER

BACKGROUND

1. Technical Field

The present invention relates to a printer driver and a network system that control a printer accepting a plurality of types of printing media.

2. Related Art

Printers of recent years have various uses from printing small-sized printing media such as postcards or L-size photo sheets to printing large-sized printing media exceeding A3 size. Accordingly, there are times when a printer driver that controls a printer needs to respond to a printing medium of a new size not considered at the time of shipment of the printer. However, in order to add the setting information of a new printing medium, the setting information should be added to a setting file and an installer of the printer driver should be rewritten. Accordingly, there is a problem that it is difficult to respond quickly to the above-described case.

In order to solve this problem, a method in which an installation set of a customized driver is written without installing the printer driver has been disclosed, for example, in JP-A-2006-309725.

However, in the typical method, the printer driver should be configured so as to acquire a response by generating a pseudo API and there is a problem that the configuration becomes complicated.

In addition, recently, the use of a printer under a configuration in which the printer is connected to a server terminal and the printer is used by a plurality of client terminals connected to a network has increased. In such an environment, when the printer driver corresponding to the printer is updated, printer drivers of the plurality of client terminals should be updated altogether.

In order to solve this problem, "Point and Print" technology in the Windows (registered trademark) operating system of Microsoft corporation disclosed, for example, in "Overview of Point and Print technology", [online], Jun. 18, 2003 [Searched on May 13, 2004], <URL:http://www.microsoft-.com/japan/windowsserver2003/techinfo/overview/pointandprint.mspx> and the like have been developed.

SUMMARY

An advantage of some aspects of the invention is that it provides a printer driver and a network system that control a printer accepting a plurality of types of printing media. The invention may be implemented in the following forms or applied examples.

[Applied Example 1]

According to Applied Example 1, there is provided a network system that includes a print server to which a printer is connected; a file server; and one or more client terminals. In addition, the print server, the file server, and the one or more client terminals are connected together on a network. The client terminal includes: a printer driver that controls the printer; a first setting file in which setting information of the printer driver arranged in a first folder, in which the printer driver is arranged, is stored; and a second setting file in which the setting information arranged in a second folder other than the first folder is stored. When the setting information is newly created or changed, a third file in which the setting information is written is arranged in the file server and the address information of the third file that is arranged in the file server is stored in a memory area of the print server. The printer driver includes: a writing unit that acquires the address information from the memory area of the print server and writes the setting information of the third file arranged in the file server in the second setting file of the client terminal based on the acquired address information; and a reading unit that reads the setting information giving priority to the second setting file in cases where the second setting file exists in the second folder.

Under such a configuration, by arranging the third file, in which newly created or changed setting information is written, in the file server and storing the address information of the third file in the memory area of the print server, the newly created or changed setting information can be written into the second setting file of the client terminal by the printer drivers of the client terminals. Accordingly, the setting information desired to be updated can be reflected on the printer drivers of all the client terminals that are connected to the network.

[Applied Example 2]

According to Applied Example 2, there is provided a printer driver that controls a printer. The printer driver includes: a first setting file, in which setting information of the printer driver arranged in a first folder, in which the printer driver is arranged, is stored; a second setting file in which the setting information arranged in a second folder other than the first folder is stored; and a registry area in which the setting information is written. In addition, the printer driver includes a writing unit that writes the setting information written in the registry area into the second setting file in cases where newly created or changed setting information is written into the registry area; and a reading unit that reads the setting information giving priority to the second setting file in cases where the second setting file exists in the second folder. The network system has a function for downloading the printer driver, the first setting file, and the registry area of the print server into the client terminal in cases where the client terminal designates anew the printer connected to the print server and for downloading the registry area of the print server into the registry area of the client terminal in cases where the registry area of the print server is updated. The printer driver downloaded into the client terminal writes the setting information that is written in the registry area by the writing unit into the second setting file arranged in the second folder of the client terminal.

Under such a configuration, by writing the setting information desired to be added into the registry area of the print server, the newly created or changed setting information is written into the second setting file of the print server by the printer driver. Since the registry area of the print server is updated, the registry area of the print server is downloaded into the registry area of the client terminal. Accordingly, the setting information desired to be added can be written into the second setting file of the client terminal by the printer driver of the client terminal. As a result, the setting information added in the print server can be reflected on the client terminal that is connected to the network.

[Applied Example 3]

According to Applied Example 3, there is provided a printer driver that controls a printer. The printer driver includes: a first setting file in which setting information of the printer driver arranged in a first folder, in which the printer driver is arranged, is stored; a second setting file in which the setting information arranged in a second folder other than the first folder is stored; a writing unit that reads the setting information written in the third file based on the address information of the third file that is stored in a predetermined memory area and writes the setting information that has been read into the second setting file; a reading unit that reads the setting information with priority given to the second setting file in cases where the second setting file exists in the second folder; and a display unit that displays a list of the setting information read by the reading unit.

Under such a configuration, for example, by arranging the third file, in which newly created or changed setting information is written, in the file server on a network and storing the address information of the third file in the memory area of the print server on the network, the newly created or changed setting information can be written into the second setting file of the client terminal by the printer driver of the client terminal. Accordingly, the newly created or changed setting information can be reflected on the printer driver of the client terminal that is connected to the network.

[Applied Example 4]

In the above-described printer driver, the printer driver checks whether the document format of the second setting file is correct in cases where the second setting file exists in the second folder and reads only the first setting file in cases where the document format is incorrect.

Under such a configuration, when the document format of the second setting file is incorrect, the setting information can be read from the first setting file even in cases where the second setting file exists in the second folder. Accordingly, it can be determined whether the second setting file was created improperly.

[Applied Example 5]

In the above-described printer driver, the printer driver can select whether to read the second setting file in cases where the second setting file exists in the second folder.

Under such a configuration, by selecting not to read the second file even in cases where the second setting file exists in the second folder, the configuration of the printer driver can be returned to its initial state.

[Applied Example 6]

In the above-described printer driver, the printer driver controls the printer based on the setting information selected from among the list of setting information displayed by the display unit.

Under such a configuration, the printer can be set based on the newly created or changed setting information, written in the second setting file.

BRIEF DESCRIPTION OF THE DRAWINGS

The invention will be described with reference to the accompanying drawings, wherein like numbers reference like elements.

FIGS. 3A to 3E are configuration diagrams showing setting screens according to the first embodiment. FIG. 3A is a configuration diagram showing the configuration of a first setting file. FIG. 3B is a configuration diagram showing a setting screen on the basis of the first setting file. FIG. 3C is a configuration diagram showing the configuration of a third setting file. FIG. 3D is a configuration diagram showing the configuration of a second setting file. FIG. 3E is a configuration diagram showing a setting screen on the basis of the second setting file.

FIG. 4A is a configuration diagram showing the configuration of a first setting file. FIG. 4B is a configuration diagram showing a setting screen on the basis of the first setting file. FIG. 4C is a configuration diagram showing the configuration of setting information written in a registry area. FIG. 4D is configuration diagram showing the configuration of a second setting file. FIG. 4E is a configuration diagram showing a setting screen on the basis of the second setting file.

DESCRIPTION OF EXEMPLARY EMBODIMENTS

Hereinafter, a network system according to embodiments of the invention will be described.

First Embodiment

<Configuration of Network System>

Figure 1:
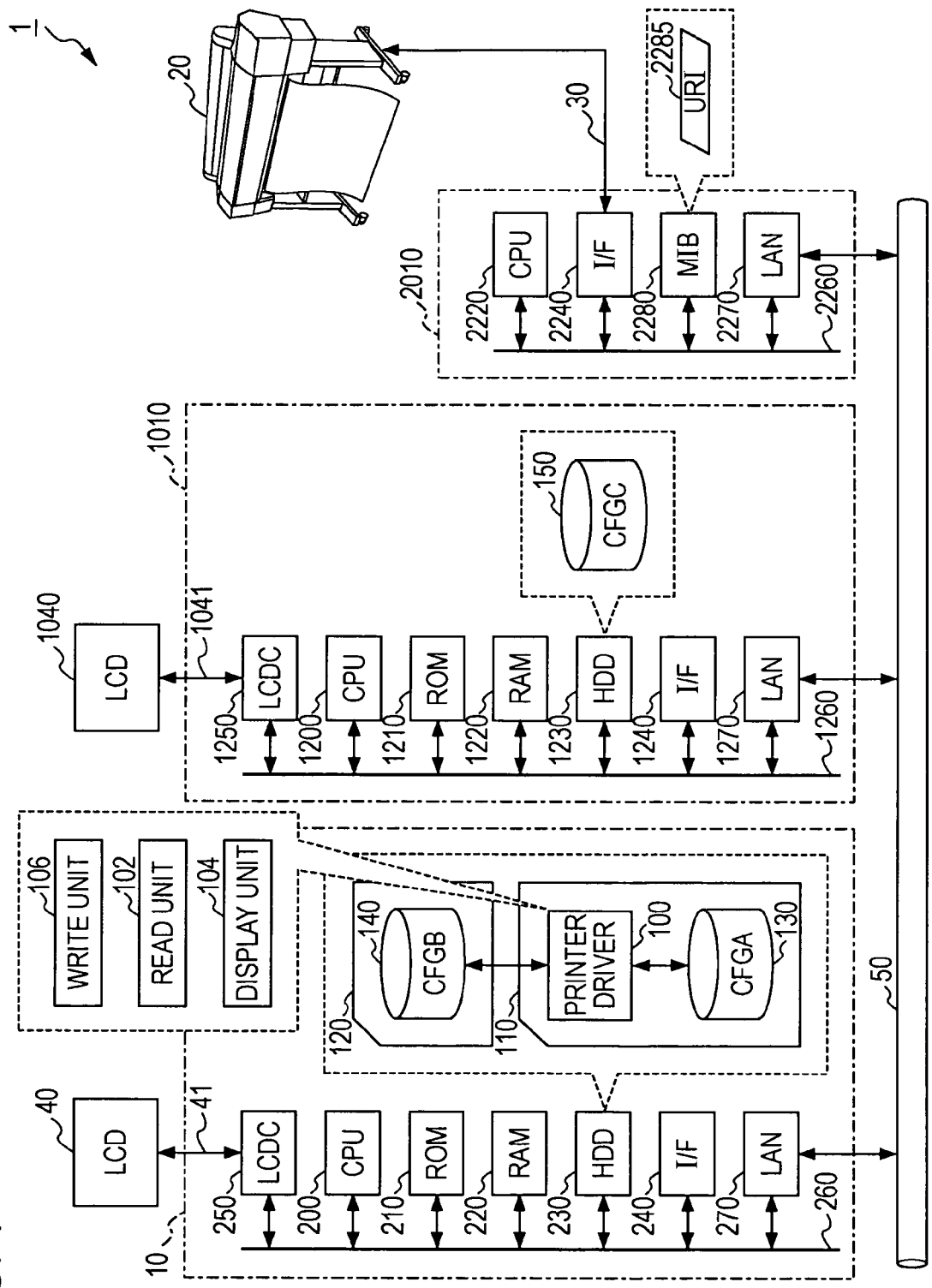
FIG. 1 is a block diagram showing the configuration of a network system according to a first embodiment of the invention.

First, the configuration of a network system according to a first embodiment of the invention will be described with reference to FIG. 1. FIG. 1 is a block diagram showing the configuration of the network system according to the first embodiment.

As shown in FIG. 1, the network system 1 is configured by one or more client terminals 10 connected to a LAN (local area network) cable 50, a file server terminal 1010, a print server 2010, a printer 20 that is connected to the print server 2010 through a cable 30, a liquid crystal display (LCD) 40 that is connected to the client terminal 10 through a connection cable 41, and an LCD 1040 that is connected to the file server terminal 1010 through a connection cable 1041. When the network system 1 is configured by a wireless LAN, the LAN cable 50 is omitted. However, in this first embodiment, a wired LAN configuration will be described.

In the client terminal 10, a CPU (central processing unit) 200, a ROM (read-only memory) 210, a RAM (random access memory) 220, an HDD (hard disk drive) 230, an external interface (I/F) 240, a liquid crystal display controller (LCDC) 250, and a LAN adapter 270 are interconnected through an internal bus 260. The LCDC 250 is connected to the LCD 40 through the connection cable 41.

In the HDD 230, a first folder 110 in which a printer driver 100 and a first setting file (CFGA) 130 are installed and a second folder 120 in which a second setting file (CFGB) 140 is arranged are arranged. When Windows (registered trademark) of Microsoft Corporation is used, the first folder 110 is arranged in a system folder. The second folder 120 is placed in any arbitrary location other than the system folder. The printer driver 100 and the CFGA 130 are included in an installer created at the time of shipment of the printer 20 or at the time of update of the printer driver 100. In the CFGB 140, setting information of the printer 20 added after the installation of the printer driver 100 can be stored.

In the file server terminal 1010, a CPU 1200, a ROM 1210, a RAM 1220, an HDD 1230, an I/F 1240, an LCDC 1250, and a LAN adapter 1270 are interconnected through an internal bus 1260. The LCDC 1250 is connected to the LCD 1040 through the connection cable 1041.

In the HDD 1230, a third setting file (CFGC) 150 is arranged. In the CFGC 150, setting information of the printer 20 added after the installation of the printer driver 100 can be stored.

In the print server 2010, a CPU 2200, an I/F 2240, a management information base (MIB) 2280 that is a memory area, and a LAN adapter 2270 are interconnected through an internal bus 2260.

The I/F 2240 is connected to the printer 20 through the cable 30. For the I/F 2240, for example, a LAN specification, a USB (universal serial bus) specification, or the like is used. LAN cable 50 is connected to the LAN adapter 270. Generally, the MIB 2280 includes a standard MIB area and a private MIB area. In the private MIB area, a URI (uniform resource identifier) 2285 that is address information representing the location of the CFGC 150 existing on a network is stored.

The printer driver 100 is configured to include a reading unit 102, a display unit 104, and a writing unit 106. The writing unit 106 acquires a URI 2285 that is stored in the MIB 2280 of the print server 2010 and writes the setting information of the CFGC 150 arranged in the file server terminal 1010 into the CFGB 140 based on the URI 2285. The reading unit 102 reads the setting information from the CFGB 140 giving it priority in cases where the CFGB 140 exists in the second folder 120. The display unit 104 displays a list of the setting information that is read by the reading unit 102.

<Configuration of Setting File>

Next, the configurations of the setting files will be described with reference to FIGS. 3A to 3E. FIG. 3A is a configuration diagram showing the configuration of the first setting file. In addition, FIG. 3B is a configuration diagram showing a setting screen on the basis of the first setting file. FIG. 3C is a configuration diagram showing the configuration of the third setting file. In addition, FIG. 3D is a configuration diagram showing the configuration of the second setting file. FIG. 3E is a configuration diagram showing a setting screen on the basis of the second setting file.

As shown in FIG. 3A, it is assumed that setting information that represents the name, the width, and the height of a paper size is stored in the CFGA 130. For example, the setting information such as "A4 210×297 mm", "A3 297×420 mm", and "A2 420×594 mm" is stored in the CFGA 130. FIG. 3B is a setting screen that is displayed in the LCD 40 by the printer driver 100 that has read the CFGA 130. As shown in FIG. 3B, in the setting screen, a list of paper sizes read from the CFGA 130 is displayed in a popup menu 131 used for selecting a paper size.

Next, as shown in FIG. 3C, it is assumed that setting information representing the name, the width, and the height of the paper size is stored in the CFGC 150. For example, the setting information such as "US B 11 in×17 in", "US C 17 in×22 in", and "US D 22 in×34 in" is stored in the CFGC 150.

Next, as shown in FIG. 3D, it is assumed that setting information representing the name, the width, and the height of a paper size is stored in the CFGB 140. For example, the setting information such as "US B 11 in×17 in", "US C 17 in×22 in", and "US D 22 in×34 in" is stored in the CFGB 140. FIG. 3E is a setting screen that is displayed in the LCD 40 by the printer driver 100 that has read the CFGB 140. As shown in FIG. 3E, in the setting screen, a list of paper sizes read from the CFGB 140 is displayed in a popup menu 141 used for selecting a paper size.

<Operation of Printer Driver>

Figure 5:
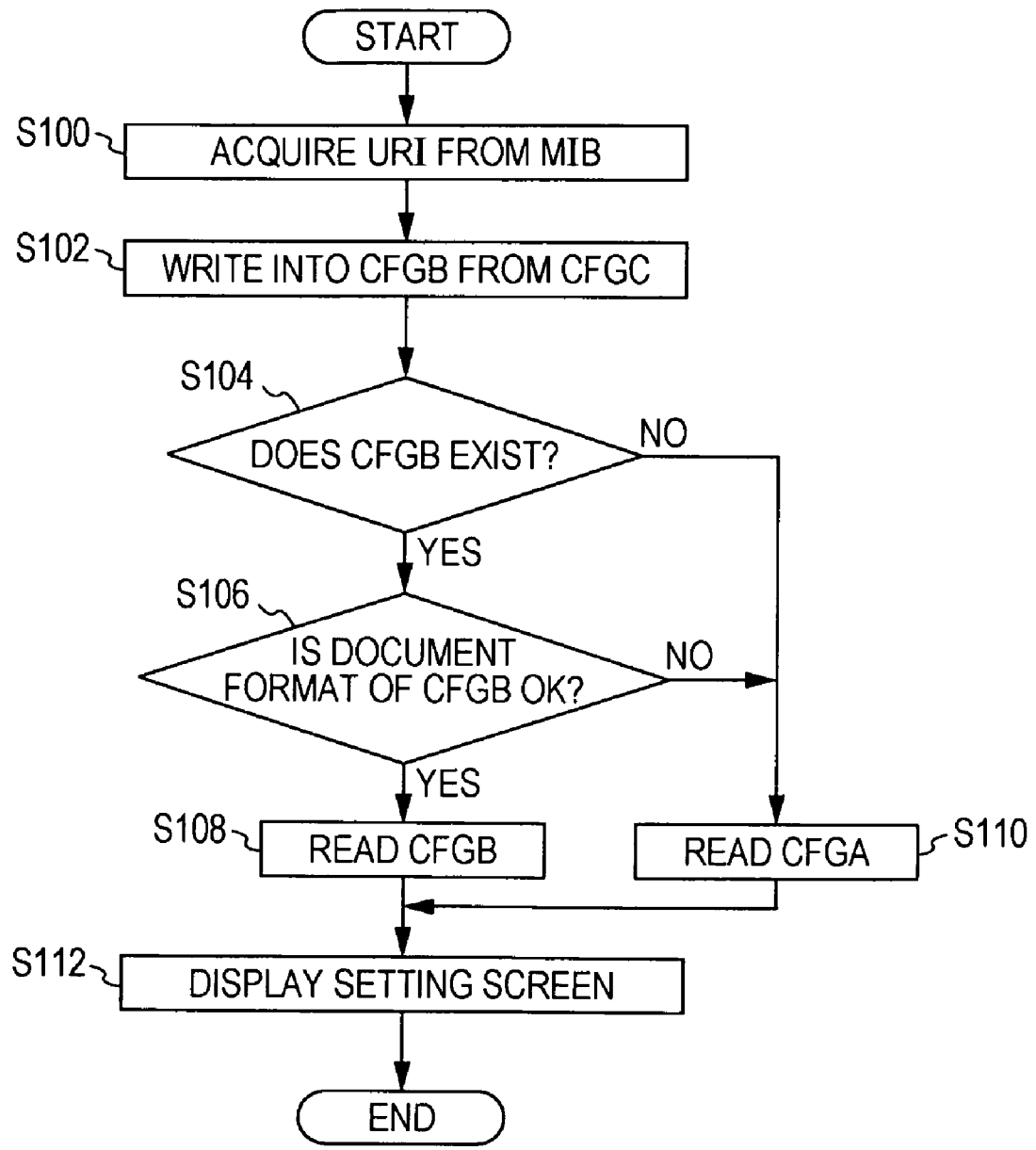
FIG. 5 is a flowchart showing the operation of a printer driver according to the first embodiment.

Next, the operation of the printer driver will be described with reference to FIG. 5. FIG. 5 is a flowchart showing the operation of the printer driver.

First, in Step S100, the writing unit 106 acquires a URI 2285 from the MIB 2280 of the print server 2010, and the process proceeds to Step S102.

Next, in Step S102, the writing unit 106 writes the setting information of the CFGC 150 arranged in the file server terminal 1010 into the CFGB 140 based on the URI 2285, and the process proceeds to Step S104.

Next, in Step S104, the reading unit 102 determines whether the CFGB 140 exists in the second folder 120. When the CFGB 140 exists, the process proceeds to Step S106. On the other hand, when the CFGB 140 does not exist, the process proceeds to Step S110.

Next, in Step S106, the reading unit 102 determines whether the document format of the CFGB 140 is correct (or empty). When the document format is correct, the process proceeds to Step S108. On the other hand, when the document format is not correct, the process proceeds to Step S110.

Next, in Step S108, the reading unit 102 reads the setting information of the CFGB 140, and the process proceeds to Step S112.

On the other hand, in Step S110, the reading unit 102 reads the setting information of the CFGA 130, and the process proceeds to Step S112.

Next, in Step S112, the display unit 104 displays a setting screen in the LCD 40 based on the setting information that has been read.

For example, in cases where setting information as shown in FIG. 3A is stored in the CFGA 130 at the time of shipment of the printer driver 100, when the setting information is not written in the CFGC 150 and the CFGB 140 does not exist in the second folder 120, a setting screen as shown in FIG. 3B is displayed. On the other hand, when setting information as shown in FIG. 3C is written in the CFGC 150, the CFGB 140 exists in the second folder 120, and setting information as shown in FIG. 3D is stored in the CFGB 140, a setting screen as shown in FIG. 3E is displayed.

According to this embodiment described above, the following advantages can be acquired.

According to this embodiment, setting information desired to be added can be written into the CFGB 140 that is the second setting file of the client terminal 10 by the printer driver 100 of the client terminal 10 by arranging the CFGC 150 that is the third file, in which setting information desired to be added is written, in the file server terminal 1010 and storing the address information (URI 2285) of the CFGC 150 in the MIB 2280 that is the memory area of the print server 2010. Accordingly, the setting information desired to be added can be reflected on the printer drivers 100 of all the client terminals 10 that are connected to the network.

Second Embodiment

<Configuration of Network System>

First, the configuration of a network system according to a second embodiment of the invention will be described with reference to FIG. 2.

Figure 2:
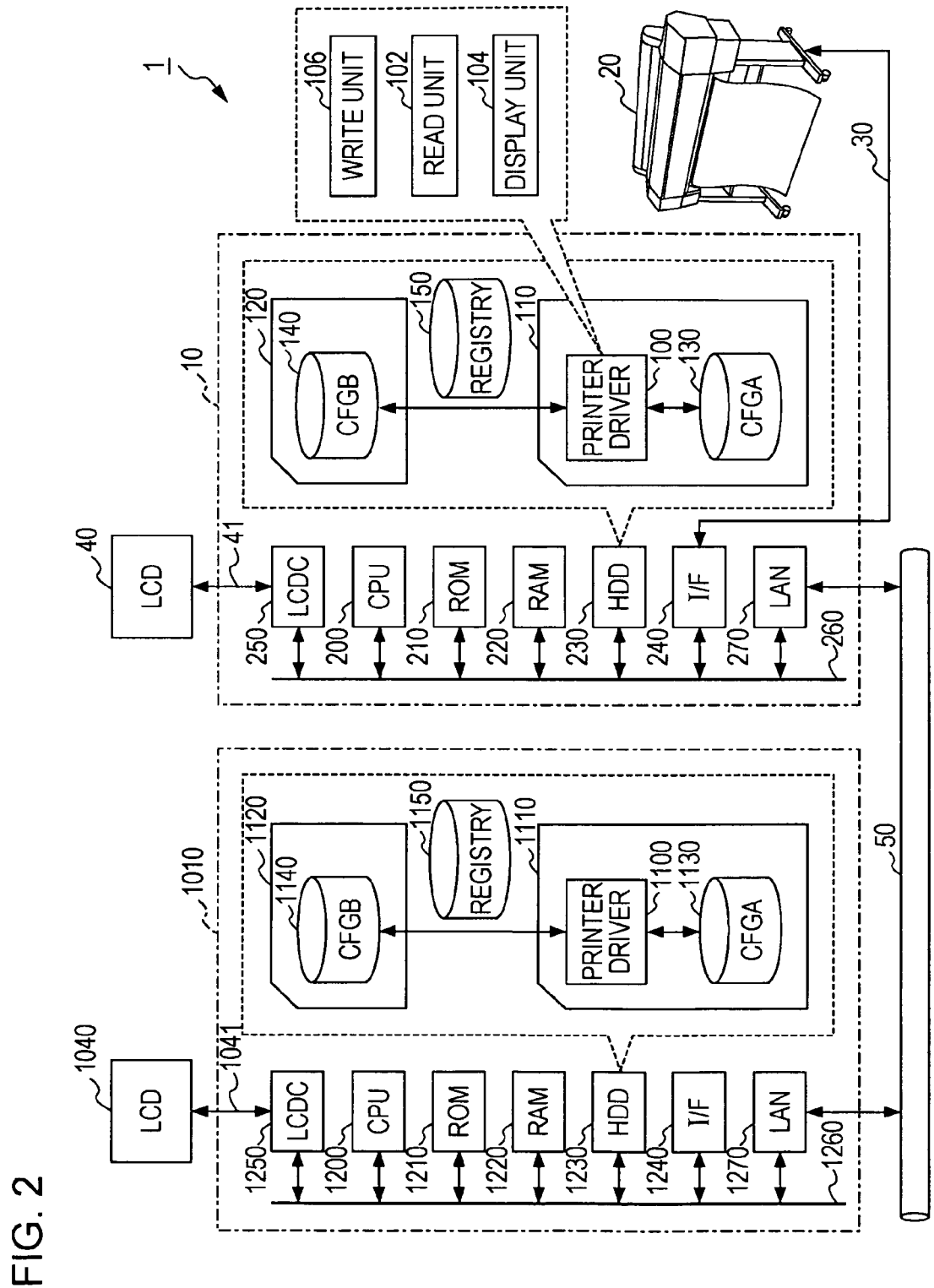
FIG. 2 is a block diagram showing the configuration of a network system according to a second embodiment of the invention.

FIG. 2 is a block diagram showing the configuration of the network system according to the second embodiment. As shown in FIG. 2, the network system 1 is configured by a server terminal 10, a printer 20, a cable 30 that connects the server terminal 10 and the printer 20 together, a liquid crystal display (LCD) 40, a LAN (local area network) cable 50 that is connected to the server terminal 10, one or more client terminals 1010 connected to the LAN cable 50, and an LCD 1040. In addition, when the network system 1 is configured by a wireless LAN, the LAN cable 50 is omitted. However, in this second embodiment, a wired LAN configuration will be described.

In the server terminal 10, a CPU (central processing unit) 200, a ROM (read-only memory) 210, a RAM (random access memory) 220, an HDD (hard disk drive) 230, an external interface (I/F) 240, a liquid crystal display (LCD) controller (LCDC) 250, and a LAN adapter 270 are interconnected through an internal bus 260.

The LCDC 250 is connected to the LCD 40 through the connection cable 41. The I/F 240 is connected to the printer 20 through the cable 30. For the I/F 240, for example, a LAN specification, a USB (universal serial bus) specification, or the like is used. LAN cable 50 is connected to the LAN adapter 270.

In the HDD 230, a first folder 110 in which a printer driver 100 and a first setting file (CFGA) 130 are installed, a second folder 120 in which a second setting file (CFGB) 140 is arranged, and a registry area 150 are arranged. When Windows (registered trademark) of Microsoft Corporation is used, the first folder 110 is arranged in a system folder. The second folder 120 is placed in any arbitrary location other than the system folder. The printer driver 100 and the CFGA 130 are included in an installer created at the time of shipment of the printer 20 or at the time of update of the printer driver 100. In the registry area 150, basic information of Windows (registered trademark), extension information of software, and the like are recorded. In addition, setting information of the printer 20 added after installation of the printer driver 100 can be recorded in the registry area 150. In the CFGB 140, setting information recorded in the registry area 150 can be stored.

The printer driver 100 is configured to include a reading unit 102, a display unit 104, and a writing unit 106. The writing unit 106 writes setting information into the CFGB 140 in cases where the setting information is written into the registry area 150. The reading unit 102 reads the setting information from the CFGB 140 giving it priority in cases where the CFGB 140 exists in the second folder 120. The display unit 104 displays a list of the setting information read by the reading unit 102.

In the client terminal 1010, similar to the server terminal 10, a CPU 1200, a ROM 1210, a RAM 1220, an HDD 1230, an I/F 1240, an LCDC 1250, and a LAN adapter 1270 are interconnected through an internal bus 1260. The LCDC 1250 is connected to the LCD 1040 through the connection cable 1041. LAN cable 50 is connected to the LAN adapter 1270.

The operating systems of the server terminal 10 and the client terminal 1010 that configures the network system 1 are configured by Windows (registered trademark). Accordingly, the function of Point and Print disclosed in "Overview of Point and Print technology", [online], Jun. 18, 2003 [Searched on May 13, 2004], <URL:http://www.microsoft-.com/japan/windowsserver2003/techinfo/overview/pointandprint.mspx> is included therein. When the client terminal 1010 designates the printer 20 that is connected to the server terminal 10, the printer driver 100, the CFGA 130, and the registry area 150 are downloaded to the client terminal 1010 from the server terminal 10 based on the "Point and Print" function.

By this download, the printer driver 1100 and the CFGA 1130 are copied to the first folder 1110 of the HDD 1230 of the client terminal 1010, and the setting information added to the registry area 1150 is copied. The writing unit 106 of the printer driver 1100 writes the setting information added to the registry area 1150 into the CFGB 1140 of the second folder 1120. The reading unit 102 of the printer driver 1100 reads the setting information giving priority to the CFGB 1140 in cases where the CFGB 1140 exists in the second folder 1120. The display unit 104 of the printer driver 1100 displays a list of the setting information read by the reading unit 102 on a setting screen.

<Configuration of Setting File>

Figure 4B:
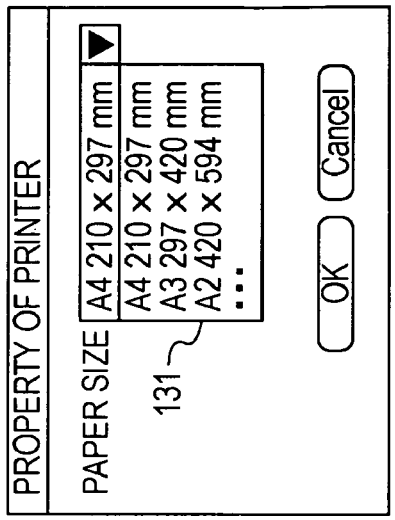
FIGS. 4A to 4E are configuration diagrams showing setting screens according to the second embodiment.
Figure 4E:
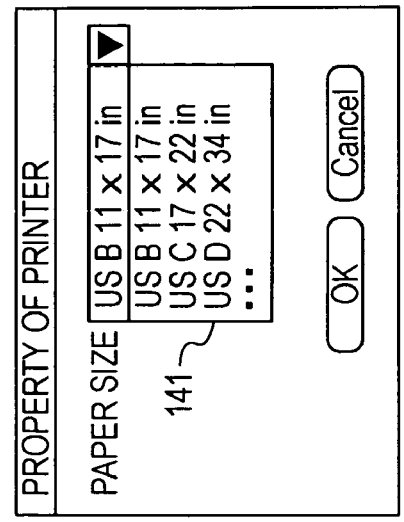
Figure 4A:
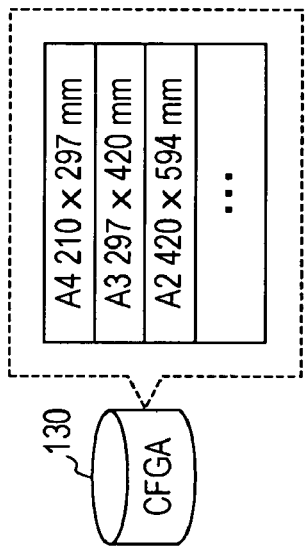
Figure 4C:
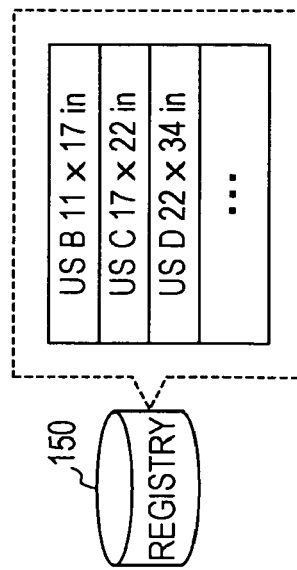
Figure 4D:
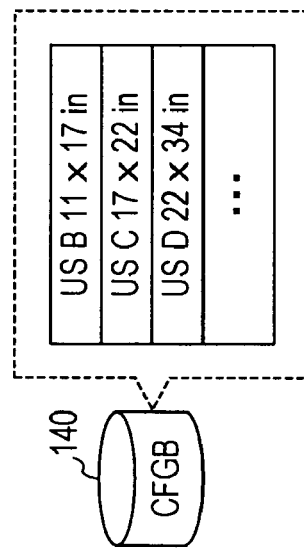

Next, the configurations of the setting files will be described with reference to FIGS. 4A to 4E. FIG. 4A is a configuration diagram showing the configuration of a first setting file. In addition, FIG. 4B is a configuration diagram showing a setting screen on the basis of the first setting file. FIG. 4C is a configuration diagram showing the configuration of setting information written in the registry area. In addition, FIG. 4D is a configuration diagram showing the configuration of a second setting file. FIG. 4E is a configuration diagram showing a setting screen on the basis of the second setting file.

As shown in FIG. 4A, it is assumed that setting information that represents the name, the width, and the height of a paper size is stored in the CFGA 130. For example, the setting information such as "A4 210×297 mm", "A3 297×420 mm", and "A2 420×594 mm" is stored in the CFGA 130. FIG. 4B is a setting screen that is displayed in the LCD 40 by the printer driver 100 that has read the CFGA 130. As shown in FIG. 4B, in the setting screen, a list of paper sizes read from the CFGA 130 is displayed in a popup menu 131 used for selecting a paper size.

Next, as shown in FIG. 4C, it is assumed that setting information representing the name, the width, and the height of the paper size is stored in the registry area 150. For example, the setting information such as "US B 11 in×17 in", "US C 17 in×22 in", and "US D 22 in×34 in" is stored in the registry area 150.

Next, as shown in FIG. 4D, it is assumed that setting information representing the name, the width, and the height of a paper size is stored in the CFGB 140. For example, the setting information such as "US B 11 in×17 in", "US C 17 in×22 in", and "US D 22 in×34 in" is stored in the CFGB 140. FIG. 4E is a setting screen that is displayed in the LCD 40 by the printer driver 100 that has read the CFGB 140. As shown in FIG. 4E, in the setting screen, a list of paper sizes read from the CFGB 140 is displayed in a popup menu 141 used for selecting a paper size.

<Operation of Printer Driver>

Figure 6:
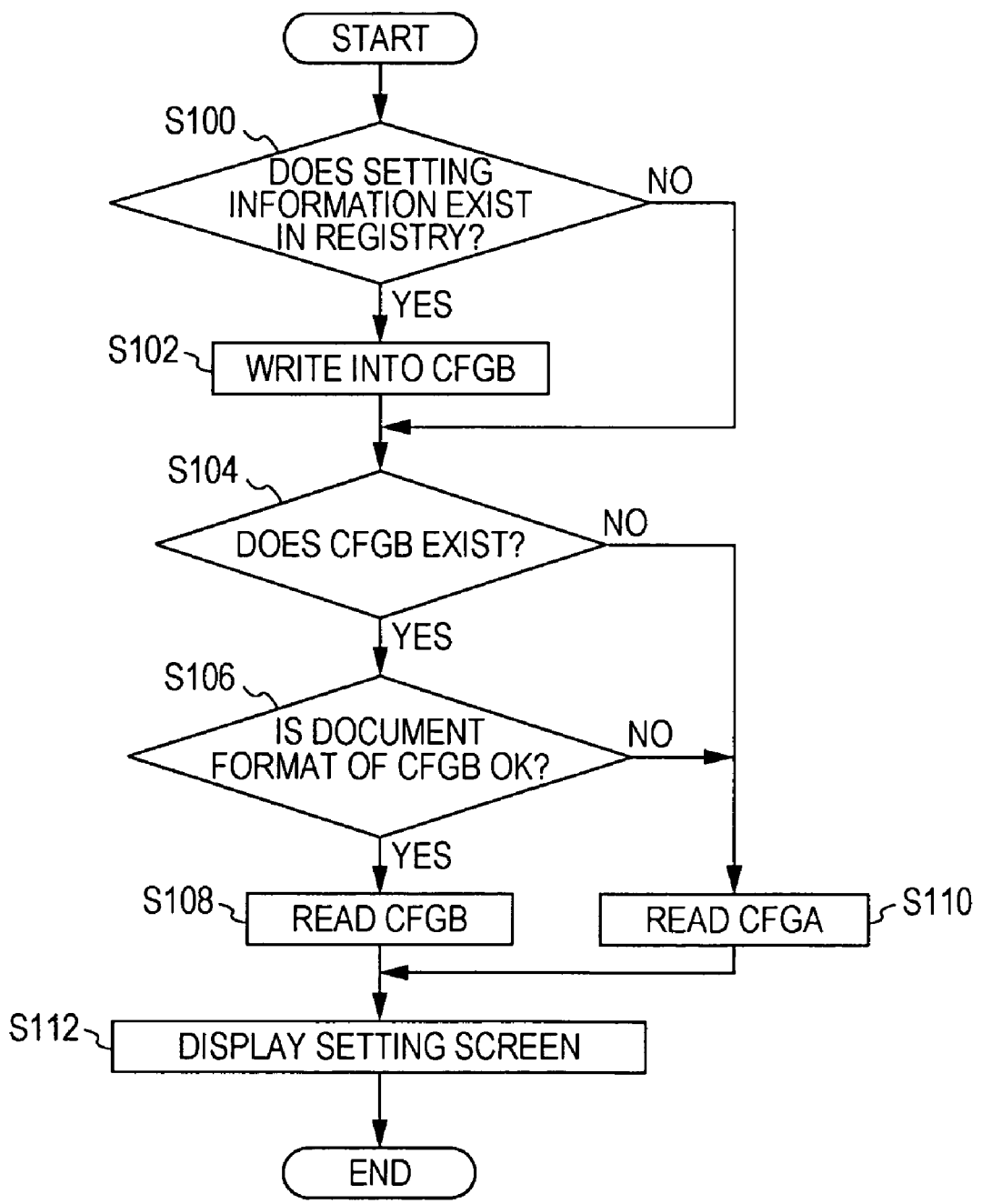
FIG. 6 is a flowchart showing the operation of a printer driver according to the second embodiment.

Next, the operation of the printer driver will be described with reference to FIG. 6. FIG. 6 is a flowchart showing the operation of the printer driver. Here, the operation of the printer driver 100 of the server terminal 10 will be described. However, the operation of the printer driver 1100 downloaded into the client terminal 1010 is performed in the same way.

First, in Step S100, the writing unit 106 determines whether the setting information exists in the registry area 150 (1150). When the registry area 150 (1150) exists, the process proceeds to Step S102. On the other hand, when the registry area 150 (1150) does not exist, the process proceeds to Step S104.

Next, in Step S102, the writing unit 106 reads the setting information of the registry area 150 (1150) and writes the setting information that has been read into the CFGB 140 (1140), and the process proceeds to Step S104.

Next, in Step S104, the reading unit 102 determines whether the CFGB 140 (1140) exists in the second folder 120 (1120). When the CFGB 140 (1140) exists, the process proceeds to Step S106. On the other hand, when the CFGB 140 (1140) does not exist, the process proceeds to Step S110.

Next, in Step S106, the reading unit 102 determines whether the document format of the CFGB 140 (1140) is correct (or empty). When the document format is correct, the process proceeds to Step S108. On the other hand, when the document format is not correct, the process proceeds to Step S110.

Next, in Step S108, the reading unit 102 reads the setting information of the CFGB 140 (1140), and the process proceeds to Step S112.

On the other hand, in Step S110, the reading unit 102 reads the setting information of the CFGA 130 (1130), and the process proceeds to Step S112.

Next, in Step S112, the display unit 104 displays a setting screen in the LCD 40 (1040) based on the setting information that has been read.

For example, in cases where setting information as shown in FIG. 4A is stored in the CFGA 130 at the time of shipment of the printer driver 100, when the setting information is not written in the registry area 150 and the CFGB 140 does not exist in the second folder 120, a setting screen as shown in FIG. 4B is displayed. On the other hand, when setting information as shown in FIG. 4C is written in the registry area 150, the CFGB 140 exists in the second folder 120, and setting information as shown in FIG. 4D is stored in the CFGB 140, a setting screen as shown in FIG. 4E is displayed.

According to this embodiment described above, the following advantages can be acquired.

According to this embodiment, by writing setting information desired to be added into the registry area 150 of the server terminal 10, the setting information desired to be added is written into the CFGB 140 of the server terminal 10 by the printer driver 100. Since the registry area 150 of the server terminal 10 is updated, the registry area 150 is downloaded into the registry area 1150 of the client terminal 1010. Accordingly, the setting information desired to be added can be written into the CFGB 1140 of the client terminal 1010 by using the printer driver 1100 of the client terminal 1010. In other words, the setting information added by the server terminal 10 can be reflected on the client terminal 1010 that is connected to the network. In addition, in cases where the document format of the CFGB 140 is incorrect (or empty) even when the CFGB 140 exists in the second folder 120, the setting information can be read from the CFGA 130. Accordingly, it can be determined whether the CFGB 140 was created improperly.

As above, the network systems, which include the printer driver, according to the embodiments of the invention have been described. However, the invention is not limited thereto at all. Thus, the invention may be realized in various forms within the scope of not departing from the general intentions described above. Hereinafter, modified examples will be described.

MODIFIED EXAMPLE 1

Hereinafter, a printer driver according to Modified Example 1 will be described. In the first embodiment, when the CFGB 140 exists in the second folder 120, the reading unit 102 will read the setting information of the CFGB 140 without any exception as has been described. However, the reading unit 102 may be configured not to read the CFGB 140 even when the CFGB 140 exists. For example, the reading unit 102 may be configured to read the setting information from the CFGA 130 and redraw the setting information in cases where a button for "returning to the initial shipment state" is provided and the button for "returning to the initial shipment state" is clicked. In such a configuration, the setting information of the printer driver 100 can be returned to the initial shipment state in a simple manner.

MODIFIED EXAMPLE 2

Hereinafter, a printer driver according to Modified Example 2 will be described. In the second embodiment, the setting information will be written into the CFGB 140 (1140) without any exception in cases where the setting information exists in the registry area 150 (1150) as described. However, things may be configured so that a determination unit for determining whether the setting information of the registry area 150 (1150) is newer than the setting information of the CFGB 140 (1140) is included further in the printer driver 100 (1100), and the setting information of the CFGB 140 (1140) is overwritten with that of the registry area 150 (1150) only in cases where the setting information of the registry area 150 (1150) is newer than that of the CFGB 140 (1140). Under such a configuration, identical CFGBs 140 (1140) are created in both the server terminal 10 and the client terminal 1010. As a result, the client terminal 1010 can acquire the latest setting information all the time.

The entire disclosure of Japanese Patent Application Nos: 2008-151400, filed Jun. 10, 2008 and 2008-164127, filed Jun. 24, 2008 and 2008-164128, filed Jun. 24, 2008 are expressly incorporated by reference herein.

What is claimed is:

1. A network system comprising:
a print server to which a printer is connected;
a file server; and
one or more client terminals,
wherein the print server, the file server, and the one or more client terminals are connected together on a network,
wherein the client terminal includes:
a printer driver that controls the printer;
a first setting file in which setting information of the printer driver arranged in a first folder, in which the printer driver is arranged, is stored; and
a second setting file in which the setting information arranged in a second folder other than the first folder is stored,
wherein, when the setting information is newly created or changed, a third file in which the setting information is written is arranged in the file server,
wherein address information of the third file that is arranged in the file server is stored in a memory area of the print server, and
wherein the printer driver includes:
a writing unit that acquires the address information from the memory area of the print server and writes the setting information of the third file arranged in the file server in the second setting file of the client terminal based on the acquired address information; and
a reading unit that reads the setting information giving priority to the second setting file in cases where the second setting file exists in the second folder.

2. A tangible computer readable medium having stored thereon a printer driver that controls a printer, the computer readable medium comprising:
a first setting file in which setting information of the printer driver arranged in a first folder, in which the printer driver is arranged, is stored;
a second setting file in which the setting information arranged in a second folder other than the first folder is stored;
a writing unit that reads the setting information written in a third file based on address information of the third file that is stored in a predetermined memory area and writes the setting information that has been read into the second setting file;
a reading unit that reads the setting information giving priority to the second setting file in cases where the second setting file exists in the second folder; and
a display unit that displays a list of the setting information read by the reading unit.

3. The computer readable medium according to claim 2, wherein the printer driver checks whether a document format of the second setting file is correct in cases where the second setting file exists in the second folder and reads only the first setting file in cases where the document format is incorrect.

4. The computer readable medium according to claim 2, wherein the printer driver can select whether to read the second setting file in cases where the second setting file exists in the second folder.

5. The computer readable medium printer driver according to claim 2, wherein the printer driver controls the printer based on the setting information selected from among the list of the setting information that is displayed by the display unit.

6. A tangible computer readable medium having stored thereon a printer driver that controls a printer, the computer readable medium comprising:
- a first setting file in which setting information of the printer driver arranged in a first folder, in which the printer driver is arranged, is stored;
- a second setting file in which the setting information arranged in a second folder other than the first folder is stored;
- a registry area in which the setting information can be written;
- a writing unit that writes the setting information written in the registry area into the second setting file in cases where the setting information is written into the registry area;
- a reading unit that reads the setting information giving priority to the second setting file in cases where the second setting file exists in the second folder; and
- a display unit that displays a list of the setting information read by the reading unit.

* * * * *